United States Patent Office 2,900,244
Patented Aug. 18, 1959

2,900,244

FINE PARTICLE PRODUCTION

Samuel W. Bradstreet and James S. Griffith, Chicago, Ill., assignors to Armour Research Foundation of Illinois Institute of Technology, Chicago, Ill., a corporation of Illinois No Drawing. Application May 19, 1954
Serial No. 431,003

10 Claims. (Cl. 75—.5)

This invention relates to fine particle production, and more particularly, to an improved method of producing materials in extremely fine particulate form as a coating or as loose particles in a powder form.

In a number of fields, the production of materials in the form of fine particles is particularly desirable. For example, in the pigment art, the finest possible particle size is ordinarily desired, and the workers in this art have spent vast sums of money and many hours of time in devising various means and methods for grinding pigment materials down to smaller particle sizes than were previously obtained. In the art of making abrasives, the abrasive action of a given compound or composition may be altered by alteration of the particle sizes of the abrasive materials therein; and in certain particularly delicate grinding operations, such as the grinding of glass lenses, etc., the abrasive action is so delicate that extremely fine particle sizes are required. Most of the optical grinding is now carried out using ceria powder, and the production of this powder in fine form suitable for carrying out this function is of great interest in this art. As will be appreciated, numerous other industries require materials in extremely fine particulate form, and in each of these industries, efforts have been made to devise new methods and means for obtaining such materials in the required particulate form.

The instant invention resides in a unique improved method of producing materials in fine particulate form by means of a spraying process which applies materials to a surface in the form of a crypto-crystalline coating of extremely fine particle size. Such coating may be readily broken down by mechanical operations such as scraping to remove the same from the surface so as to obtain the loose particles in the form of a powder.

It is, therefore, an important object of the instant invention to provide an improved method of producing fine particles, and improved compositions comprising the same.

It is a further object of the instant invention to provide an improved method of obtaining a fine powder, which comprises applying to a surface an adherent thin crypto-crystalline metal oxide coating, and then mechanically breaking down the coating and removing the same from the surface to obtain the cryptocrystalline metal oxide in powder form.

Other objects, features and advantages of the instant invention will become apparent to those skilled in the art from the following detail disclosure of preferred embodiments thereof.

The instant invention consists in an improved method of obtaining a fine powder, which comprises spraying a solution in a volatile solvent of a metal compound that is thermally decomposable to yield a metal oxide against a surface hot enough to thermally decompose the compound and release discrete metal oxide particles which impinge against the surface and to effect substantially complete vaporization of the remaining volatile components within the period of time from just prior to contact between the particles and the surface to substantially the instant of contact between the particles and the surface, and then collecting the particles in loose finely divided form. The particles which impinge against the surface may bounce off and be collected or they may adhere loosely or securely to the surface, in which case, they may be mechanically removed from the surface by scraping.

One of the more specific aspects of the instant invention resides in the production of ceria coatings which may be broken down to provide powdered ceria useful in the grinding of lens (or the ceria may be produced outright in powdered form, as will be explained). In general, the instant spraying method comprises atomizing a 1 to 20% (and preferably 1 to 10%) ceria content cerium salt (i.e., nitrate) solution in a volatile solvent (i.e., water) and directing the atomized solution against a surface maintained at 400–800° F. (the lower range of 400–600° F. being preferred sometimes) at a rate sufficient to impinge ceria particles against the surface and to effect substantially complete vaporization of the remaining volatile components within the period of time from just prior to contact between the particles and the surface to substantially the instant of contact between the particles and the surface. The particles may then be collected, those particles which do not bounce off the surface being scraped or otherwise mechanically removed therefrom. The process may be demonstrated as follows:

The surfaces used in this demonstration are provided by mild steel plates which are maintained at 700° F. in an electric furnace. Aqueous cerium nitrate, $Ce(NO_3)_3 \cdot 6H_2O$, in various ceria ($CeO_2$) contents are sprayed (using a paint spray gun) onto different mild steel plate speciments, which are maintained at 700° F. The technique here used for applying the coating, which may be done at temperatures ranging from 400 to 800° F., is that believed to be most favorable for the application of an adherent ceria coating; and it involves operation of the spraying in accordance with observed results. If the spraying is too fast or too heavy, wet spots appear on the plates and blisters and the like imperfections will result at these locations. Also, the plates tend to cool too rapidly. If the spraying is too slow, the ceria particles appear to form agglomerates in the air which bounce off the plate as sand-like particles, instead of adhering. In the instant process, it is desired to obtain as an ultimate end product loose ceria particles to be used in the grinding of lens. However, it has been found that impinging the ceria particles on the surface so as to adhere thereto produces a finer size ceria particle than is obtained merely by bouncing the particles off the surface. In either case, ceria powder is obtained as the ultimate end product, as long as ceria particles impinge against the surface. It is possible to heat the surface to such an extent that decomposition of the entire solution takes place so far away from the surface that no ceria particles impinge against the surface (and the ceria particles thus formed are so fine that they are substantially lost as dust). On the other hand, ceria particles which adhere to the surface are those which have undergone a minimum of agglomeration after being released from the solution and these particles are extremely fine. The spraying rate may be correlated with the plate temperature so as to obtain the result falling between the two extremes of wetting the plate and of obtaining mere dust which cannot be collected.

It will also be appreciated that an adherent ceria coating on the metal surface has a number of other uses such as effecting resistance to corrosion, resistance to molten materials, electrical and heat insulation, etc. A particularly unique use of this ceria coating is that of providing extremely fine ceria powder by breaking down the coating, however.

The mechanics and theoretical considerations believed to be involved in the foregoing reaction, as well as the various reaction conditions, etc., are set forth in greater detail in our application Serial No. 338,585, filed February 24, 1953, now U.S. Patent No. 2,763,569, entitled "Spraying Process and Products" which disclosure is incorporated herein by reference and made a part hereof. The invention described and claimed in application Serial No. 338,585 relates to the generic coating process per se and surfaces generally coated with the instant cryptocrystalline layer.

In general, it is understood that the metal oxide is present in the solution, i.e., the ceria, in a form such that the metal atom is substantially unsolvated, or at least weakly solvated, in the solvent system. It is believed that the decomposition of the cerium nitrate takes place immediately prior to or at the very instant of contact with the heated metal surface of the plate, so that molecular size ceria particles are instantly released from what constituted a solution thereof. Such molecular size ceria particles are thus impinged against the surface; and if insufficient agglomeration of the particles has taken place, these ceria particles adhere to the surface by virtue of physical phenomena such as intermolecular attraction, as contrasted to a true chemical bond and also as contrasted to the formation of a fused coherent or integrated layer of ceria adhering to the surface by virtue of its own integration. Conceivably, only CeO in essentially an ionic form is released and it acquires another oxygen atom approximately at the time it contacts the surface. In any event, the ceria on the surface is in the form of extremely minute crystals or crystallites which recent methods of analysis indicate are in the neighborhood of 50–200 A.; and such analyses indicate clearly that these crystallites have sizes that are not greater than the wavelength of visible light (i.e., 2000–3000 A.). The agglomerated particles which do not adhere well and/or actually bounce off of the surface are, of course, bigger in size than the minimum size of approximately 50–200 A., although these agglomerates are still extremely minute particles.

Such a condition is known as "crypto-crystalline," in that the ceria adhering to the surface is truly crystalline with irregularities therein being in form (not valence, as in the case of amorphous materials). This cryptocrystalline ceria film is flexible and adherent coatings applied to sheet metal, by a procedure similar to that just described, adhere firmly without cracking, etc. when the sheet metal is folded over, or if the sheet metal is heated and then quenched.

The initial coatings applied by the foregoing procedures using a typical paint spray gun have thicknesses ranging from as little as about ½ mil to as much as about 7 mils; and the results obtained may be described as follows:

| Solution Concentration, CeO$_2$ wt. percent | Observations |
| --- | --- |
| (1) 19.9 | Visible white coating quickly produced; large particle size; relatively loosely adhering. |
| (2) 11.9 | Large quantities of relatively non-adherent powder produced with some adherent white material. |
| (3) 9.9 | Several areas of adherent white material found in the coating. |
| (4) 7.9 | Still more adherent white material present in the coating. |
| (5) 5.0 | Relatively thin coating that is not very adherent. |
| (6) 2.5 | Several sprayings required to deposit a pale yellow, relatively poorly adherent film. |
| (7) 1.6 | Several sprayings were made and the coating applied is barely visible. |

It will be appreciated that the adherence of the coating may be altered by adjustment of the spraying technique, concentration and plate temperature. It will also be noted that using the relatively dilute concentrations of less than 4% ceria content, the coatings applied appear to be pale yellow, whereas higher concentrations up to about 8% ceria content will give a relatively adherent coating which is white, and concentrations above this give a poorly adherent large particle size white coating. The pale yellow films applied using this technique may be converted to a lighter white color by additional heating which is employed to serve to partially agglomerate or stabilize the crystalline structure, thereby increasing the particle size. With or without the additional heating step, the coatings may be scraped from the plates so as to obtain an extremely fine loose powder. Substantially the same results may be obtained using ammonium cerium nitrate.

Cerium is typical of the rare earth metals and it is one of the most abundant members thereof. In the particular instance, ceria particles are useful in certain fine grinding processes; but the other rare earth oxides in fine particulate form are also useful in the abrasives field. For example, spraying with one, two and four percent rare earth oxide content aqueous nitrate solutions of the particular rare earth metal (Ce, Pr, Nd, Sm, Eu, Gd, Dy, Ho, Er, Tm, Yb, and Th), results in the formation of adherent crypto-crystalline coatings of the particular rare earth metal oxide employed. Also, mixtures of the rare earth metal oxides may be deposited as well as mixtures of one or more of these oxides with other metal oxides. For example, a mixture of (4% ceria) aqueous cerium nitrate and (4% chromia) aqueous chromium nitrate was found to give a coating of superior adherence at spraying temperatures of 400 to 600° F.; and it has been found that each of the foregoing rare earth nitrate solutions above mentioned may be sprayed at 400–600° F. similarly to obtain an adherent coating. Coatings may be obtained using temperatures within the range of 400–800° F.

Particularly fine particles of any of the various (polyvalent) metal oxides may be obtained from suitable solutions of the compounds of the metal in accordance with the practice of the instant invention. In the case of all of such metallic compounds wherein the metallic ion component does not have an appreciably great tendency toward solvation, the nitrate salts may be employed effectively at temperatures in the neighborhood of 600° F. and within the range of about 400–500° F. to about 700–800° F.

Another feature of the invention which may be demonstrated is that the metallic atom in the molecule that is to be decomposed need not be in the cation and, in the case of compounds having a volatile cation, such as the ammonium cation, it is possible to use an anion containing the metal to be employed. Such a metal is, of course, amphoteric. For example, it has been found that ammonium chromate is particularly useful in the practice of the instant invention and ammonium chromate may be used in aqueous or other solvent media in substantially the same chromia contents as those hereinbefore described for the use of cerium salts wherein cerium forms the cation. In like manner, chromium nitrate salts may be used in substantially the same chromia contents. The operating temperatures employed are also substantially the same. The operating temperatures, as has been explained, involve those temperatures which are required to effectively prevent any tendency toward solvation between the solvent and the metal oxide. In most instances, it has been found that this particular temperature consideration is controlling, since the remaining volatile components of decomposition usually are removed much more readily and the most difficult or most slowly removed component is any portion of the solvent or other volatile materials which may tend to form a semi-chemical bond with the metal oxide through the phenomenon of solvation. The chromia coatings obtained using this process are black, and the extremely fine black particles of chromia are useful as a pigment, when scraped or otherwise removed from the surface coated.

The technique for applying these coatings in each case is substantially that hereinbefore described. Some metal oxides require slightly higher temperatures than others in order to effectively remove the solvent or effect "unsolvation," but the technique of application is that just described. In particular, the nitrates of a number of metals have been found to be most satisfactory for the deposition of the metal oxides therefrom in accordance with the practice of the instant invention. Various amines may be used and also various salts of organic acids such as the acetates may be used. In general, the compound which may be used is a compound soluble in the solvent medium (which is preferably water), which contains the metal atom and no other atoms other than carbon, hydrogen, oxygen, and nitrogen. Although there may be exceptions in the case of certain metals, whereby a greater variety of compounds of these metals may be used, it has been found that solutions of a solid oxide forming metal, which is in solution in the form of a compound of this metal with no other atoms in the molecule except oxygen, carbon, nitrogen and hydrogen are effective in the practice of the instant invention. The solutions must, of course, have an appreciable concentration (i.e., the compounds themselves must be appreciably soluble in the solutions, so as to exclude a pure carbonate salt but permit the use of ammonium carbonate complexes such as ammonium zirconyl carbonate). It will also be noted that all of such compounds are heat decomposable at the operating temperature. Such compounds also contain oxygen and preferably nitrogen; and if carbon is present in such compounds, then nitrogen and/or hydrogen are also present with the oxygen.

As previously mentioned, however, the nitrates are most preferably used in the case of the greater number of metals. The nitrates which may be used include those of the metals of Group I-B (Cu); II-A (Mg, Ca, Ba and Sr); II-B (Zn and Cd); III-A (Sc, Y and La); III-B (Al, Ga, In and Te); IV-A (Ti, Zr and Hf); IV-B (Si, Pb and Sn); VI-A (Cr, Mo and W); VII-A (Mn); VIII (Fe, Co, Ni, Ru, Rh, Pd, Os, Ir); and the rare earth metals (Ce, Pr, Nd, Sm, Eu, Gd, Dy, Ho, Er, Tm, Yb, Th). The noble metals form a deposit not identified as the oxide thereof. The ammonium carbonate salts which may be used include Mg, Ca, Ba, Sr, Al, Zr, Hf and Ce. In general, all these may be used in aqueous (or alcoholic-aqueous) 1–10% metal oxide content solutions at temperatures within the range of 400–1200° F.

In general, it will be seen that the anion employed (whether or not it contains the metal atom) must be thermally unstable at operating conditions, and whichever ion (anion or cation) which does not contain the metal atom must be thermally unstable at operating conditions. Primarily, the metal compound is clearly unstable at the spraying operating conditions. Also, the metal component or ionic portion of the compound, before and after decomposition must be substantially unsolvated, i.e., the solvated form either does not exist or it is thermally unstable at the operating temperatures. Also, the linkage or bond between the cation and the anion is, of course, unstable so as to permit decomposition.

Another aspect of the instant invention resides in heat treatment of the coating of metal oxide so as to alter the particle size and crystal structure, for example, by converting the material from its original crypto-crystalline state to a truly crystalline state. For example, using a 4% zirconia content aqueous ammonium zirconyl carbonate and spraying the same onto a mild steel plate heated at 400° F., it will be found that an adherent crypto-crystalline layer of zirconia is formed on the steel. This layer has a refractive index substantially below that normally reported for zirconium oxide crystals; it is isotropic and gives no X-ray diffraction pattern. When the zirconia coated steel is heated above 1000° F., the pattern of stabilized zirconia gradually appears, even though no stabilizing agent is present. When the sample is heated to 1800° F. in gettered argon, a network of fine cracks appears in the coating, and the monoclinic diffraction pattern is observed after 15 minutes of such heating. In the practice of the instant invention, it is often advisable to heat the coating until it has a stabilized X-ray diffraction pattern (for example, heating the zirconia coating at 1000° F. as just described) before removing the coating from the surface and converting it to a powder. In its finely divided form on the surface, the rate of agglomeration or stabilization of the pattern may be controlled relatively easily during heating. Also, the crypto-crystalline particles here formed in many instances do not possess certain properties which might be desired in the powdered metal oxide. For example, titania is deposited in crypto-crystalline form in accordance with the practice of the invention so as to give a tan colored coating, rather than the bright white titania pigment, which may be desired. Such a titania crypto-crystalline coating may be obtained using titanium nitrate (4% titania content) in acid (HCl) aqueous solution maintained under about ½ atmosphere pressure, prior to spraying, and using relatively low surface temperatures of around 300–400° F. Comparable results are obtained using titanium tetraalkoxide (wherein the alkoxide radical has from 1 to 4 carbon atoms and is preferably ethoxide) in an acid (HCl) aqueous solution and/or using titanium tetrachloride in the acid aqueous solution, in each case the solution having a titanium content equivalent to that referred to in connection with the titanium nitrate. In each case, the titania coating is tan; but after heating the coating at about 1000° F. (or at a temperature less than the fusion temperature of titania), the coating gradually turns whiter and an X-ray diffraction pattern of stabilized titania appears. In this way, it is possible to make the smallest white titania particles which can be made. Particles of a slightly smaller size (such as those which are originally deposited) are not white but tan. The white titania thus obtained is an extremely fine particulate form and is particularly useful as a white pigment.

Still another aspect of the instant invention resides in the use of a gaseous reducing atmosphere during the heating of the coating until it has a stabilized X-ray diffraction pattern. Such reducing atmosphere can, of course, be used to completely reduce the metal oxide to the metal and the metal thus obtained will be in extremely fine particulate form, thus making it particularly useful for example in the making of powdered metal compacts. However, the instant invention also contemplates the use of a gaseous reducing atmosphere, either during the spraying operation, or after the spraying operation when heating of the coating is undertaken in order to obtain a stabilized X-ray diffraction pattern. An example of a use for this aspect of the invention is that of imparting fluorescence to zinc oxide pigment particles. The general nature of the reaction is described in detail in United States Patent No. 2,585,461, issued to Benjamin L. Hirsch on February 12, 1952; wherein it is pointed out that zinc oxide pigments in particulate form may be exposed to a gaseous reducing atmosphere such as an atmosphere containing 28% carbon-monoxide, 3.5% carbondioxide, 66% nitrogen and 2.5% hydrogen at elevated temperatures so as to impart fluorescence to the zinc oxide without causing excessive agglomeration or causing darkening of the zinc oxide by the formation of zinc sub-oxides or zinc metal. In essence, this process involves the use of a reducing atmosphere so as to effect a very minor amount of reduction, but a perceptible amount, because it causes internal strains in the crystal structure of the zinc oxide, thereby giving the zinc oxide "reaction points" which will convert light of a given wavelength to light of a slightly longer wavelength (i.e., ultraviolet light to blue light). The problem which Hirsch overcomes is that of avoiding agglomeration by the use of sulfur dioxide; but in the instant invention the crypto-crystalline zinc oxide particles, deposited as a coating from a 4% zinc oxide content aqueous zinc nitrate solution at a spraying temperature of 1000–1200° F., may undergo a small amount of agglomeration as the X-ray diffraction pattern stabilizes and while the partial reduction is taking place to impart fluorescence thereto. The fluorescent particles may then be removed from the surface and broken down into a loose fluorescent powder. This mechanical breaking down of the coating is so mild (and so unlike actual grinding of zinc oxide, which causes a loss of fluorescence therein) that there is no loss of fluorescence during the breaking down of the coating. Substantially the same results may also be obtained using a crypto-crystalline tin oxide coating (deposited from a 4% tin oxide content aqueous tin nitrate-stannous or stannic-solution at a spraying temperature of 600–700° F.). In each case, the reaction conditions of Hirsch may be employed, but the instant crypto-crystalline coatings are substantially more reactive than plain zinc oxide or tin oxide and the reducing reaction thus takes place more readily (but those skilled in the art following the teachings of Hirsch will readily recognize this and the only precaution necessary is that of discontinuing reduction before discoloration takes place). Also, since the crypto-crystalline metal oxide particles are particularly reactive just as they are released from solution and impinge upon the surface to be coated, a reducing atmosphere can be used for the atmosphere in which the spraying step is carried out, in order to effect an appreciable amount of reduction.

Still another aspect of the instant invention resides in the use of a gaseous atmosphere during heating of the coating which has more drastic reducing properties, so as to obtain a pure metal coating. As previously mentioned, a reducing atmosphere such as that employed by Hirsch can be used merely to impart partial reduction, or a reducing atmosphere such as a substantially complete hydrogen atmosphere may be used so as to effect complete reduction of the metal oxide to the metal. The metal particles thus obtained may be mechanically removed from the coated surface so as to obtain extremely fine pigment-size particles which may be used as pure metal pigments, or, if desired, may be used in the formation of powdered metal compacts, because of their fine particle size. For example, a 4% nickel oxide content aqueous nickel nitrate solution is sprayed against a glass plate at 600° F. to obtain a nickel oxide deposit on the glass plate, which is black as applied. The black coating is then exposed to a slow stream of ammonia gas at about 950° F. and the black coating is quickly reduced to metallic gray. The extremely high surface area provided by the minute nickel oxide particles here deposited permits extremely rapid reducing action and also results in extremely complete reducing action. During this action, there is a certain amount of particle growth, but the particles which remain are extremely fine particles which may be used as pigments in the so-called "metal" paints commercially available. As those skilled in the art will appreciate, reducing the action may be carried out using any of the metal oxides which may be applied as coatings in the practice of the instant invention; although the extent to which certain metal oxides resist reduction will determine the drastic nature of the reducing conditions required; and in the case of difficultly reduced oxides, the particle growth may be appreciable during the reducing reaction. In general, the reducing reaction may be accomplished using a gaseous reducing atmosphere (e. g. $H_2$ or $NH_3$) at an elevated temperature (e.g. 900–1500° F.) with oxides of metals having a greater E.M.F. than Mn in the electromotive force series. Those oxides of metals having an E.M.F. of Mn or less (e.g. Mn, Al, Mg, Ba, Sr, Ca, etc.) are only difficultly reduced to the metal in a gaseous reducing atmosphere; whereas the oxides of metals having E.M.F.'s greater than Mn (e.g. Zn, Cr, Cd, Fe, Co, Sn, Pb, Cu, Bi, Sb, etc.) may be reduced readily to the metal in a gaseous atmosphere. The noble metals (e.g. Ag, Au and Pt) and Hg may be reduced to the oxide merely by heating in ordinary air; and the noble metals tend to deposit a predominantly metal-containing coating (with relatively insignificant amounts of oxide therein) in the practice of the invention. The "gas-reducible" crypto-crystalline metal oxide (or predominately metal oxide) coatings may thus be classified as oxides of metals having an E.M.F. (volts) within the range of −1.0 volt (Mn having −1.075 volts) to about +0.7 volt (Hg having +0.748 volt).

In general, the metal oxides, and particularly the rare earth metal oxides, may be obtained in particle sizes such that substantially all of the particles will pass through a 3000 mesh screen (i.e. 4 micron size), and at least 50% of the particles will pass through a 10,000 mesh screen (i.e. 1 micron size). In the case of other metal oxides, such as those obtained from crypto-crystalline zirconia, titania and alumina coatings, the particle sizes are such that substantially all of the material will pass through a 3000 mesh screen and at least 50% of the material will pass through a 10,000 mesh screen. If, however, the crypto-crystalline metal oxide coatings of any of the oxides of these metals (including the rare earth metals) are heated sufficiently to obtain a stabilized X-ray diffraction pattern, then the resulting particle sizes are such that substantially all of the material will pass through a 1200 mesh screen (i.e. 10 microns) and at least about 50% of the material will pass through a 3000 mesh screen. Substantially the same results are obtained in the production of fluorescent zinc oxide and tin oxide particles, since this partial reduction is easily accomplished in the time required to stabilize the X-ray diffraction pattern.

Other examples of rare earth metal oxides may be obtained by spraying a 4% thorium oxide content thorium nitrate aqueous solution at 600–700° F.; a 4% praseodymium oxide content praseodymium nitrate aqueous solution at 600–700° F.; or a 4% neodymium oxide content neodymium nitrate aqueous solution at 600–700° F. In each case, a grayish white coating of the crypto-crystalline oxide is obtained and the coating may be broken down to obtain fine particles of the sizes just described. In each case, the rare earth metal (thermally decomposable) salts such as the nitrates, acetates, ammonium carbonates, etc. may be most advantageously sprayed at metal oxide contents of 2–6% in aqueous solutions at 600–700° F. in the practice of the invention.

It will be understood that modifications and variations may be effected without departing from the scope of the novel concepts of the present invention.

We claim as our invention:

1. A method of obtaining a fine powder, which comprises spraying a solution in a volatile solvent of a metal compound that is thermally decomposable to yield a metal oxide against a surface hot enough to thermally decompose the compound and release discrete metal oxide particles which contact and adhere to the surface as a coating layer, and then mechanically breaking down the coating and removing the same from the surface to obtain the crypto-crystalline metal oxide in powder form.

2. A spraying method which comprises atomizing a 1–10% ceria content cerium nitrate solution in a volatile solvent and directing the atomized solution against a surface maintained at 400–600° F. at a rate sufficient to impinge ceria particles against the surface and to effect substantially complete vaporization of the remaining volatile components within the period of time from just prior to contact between the particles and the surface to substantially the instant of contact between the particles and the surface.

3. A spraying method which comprises atomizing a

1–10% rare earth metal oxide content solution in a volatile solvent of a thermally decomposable nitrate salt of the metal and directing the atomized solution against a surface maintained at 400–800° F. at a rate sufficient to impinge the rare earth metal oxide particles against the surface and to effect substantially complete vaporization of the remaining volatile components within the period of time from just prior to contact between the particles and the surface to substantially the instant of contact between the particles and the surface.

4. A method of obtaining a fine powder, which comprises applying to a surface an adherent thin cryptocrystalline tan titania coating, heating the coating just until its tan color is changed to white, and then mechanically breaking down the coating and removing the same from the surface to obtain powdered titania.

5. A method of obtaining a fine powder, which comprises applying to a surface an adherent thin cryptocrystalline metal oxide coating, then heating the coating until it has a stabilized X-ray diffraction pattern in the presence of a gaseous reducing atmosphere, and then mechanically breaking down the coating and removing the same from the surface to obtain a powder.

6. A method of obtaining a fine powder, which comprises applying to a surface an adherent thin cryptocrystalline zinc oxide coating, then heating the coating until it has a stabilized X-ray diffraction pattern in the presence of a reducing atmosphere to impart fluorescence thereto, and then mechanically breaking down the coating and removing the same from the surface to obtain fluorescent zinc oxide particles.

7. A spraying method which comprises atomizing a 1–10% ceria content cerium nitrate solution in a volatile solvent and directing the atomized solution against a surface maintained at 400–600° F. at a rate sufficient to impinge ceria particles against the surface but insufficient to cause appreciable adherence between the particles and the surface, and collecting such particles.

8. A method of obtaining a fine powder, which comprises spraying a solution in a volatile solvent of a metal compound that is thermally decomposable to yield a metal oxide against a surface hot enough to thermally decompose the compound and release discrete metal oxide particles which impinge upon the surface but do not adhere appreciable thereto, and collecting such particles.

9. A method of obtaining a fine powder, which comprises spraying a solution in a volatile solvent of a metal compound that is thermally decomposable to yield a metal oxide against a surface hot enough to thermally decompose the compound and release discrete metal oxide particles which impinge against the surface and to effect substantially complete vaporization of the remaining volatile components within the period of time from just prior to contact between the particles and the surface to substantially the instant of contact between the particles and the surface, and then collecting the particles in loose finely divided form.

10. A method of obtaining a fine powder, which comprises applying to a surface an adherent thin cryptocrystalline metal oxide coating, then heating the coating in the presence of a gaseous reducing atmosphere to reduce the metal oxide to the metal, and then mechanically breaking down the coating and removing the same from the surface to obtain a powdered metal.

References Cited in the file of this patent

UNITED STATES PATENTS

| | | |
|---|---|---|
| 350,148 | Murray | Oct. 5, 1886 |
| 1,838,359 | Brinker | Dec. 29, 1931 |
| 2,298,464 | Burwell | Oct. 13, 1942 |
| 2,327,992 | Blumenfeld | Aug. 31, 1943 |
| 2,372,367 | Depew | Mar. 27, 1945 |
| 2,551,341 | Scheer et al. | May 1, 1951 |
| 2,585,461 | Hirsch | Feb. 12, 1952 |
| 2,670,273 | Munn | Feb. 23, 1954 |
| 2,739,566 | Shapiro et al. | Mar. 27, 1956 |

OTHER REFERENCES

Publication, "Powdering Liquids by the Spray Drying Process," of the Industrial Waste Products Corp. (later the Spray Dryer Process Corp., 165 Broadway, New York), 1923, 10 pages.